Aug. 2, 1932.  L. KROPFF  1,870,056
ROTOR FOR TURBOGENERATORS
Filed July 3, 1929
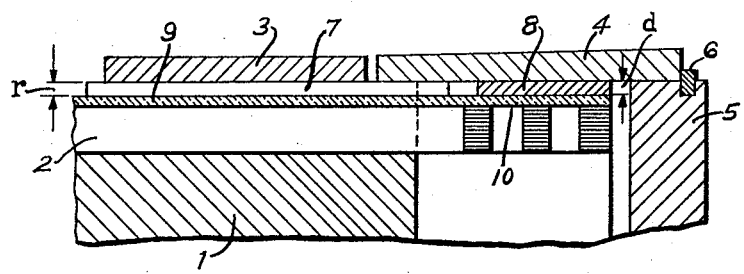
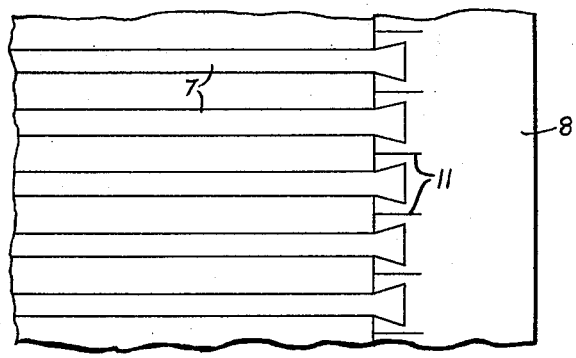
INVENTOR
Ludwig Kropff
BY
Wesley G. Carr
ATTORNEY Patented Aug. 2, 1932

1,870,056

UNITED STATES PATENT OFFICE

LUDWIG KROPFF, OF BERLIN-CHARLOTTENBURG, GERMANY, ASSIGNOR TO WESTINGHOUSE ELECTRIC & MANUFACTURING COMPANY, A CORPORATION OF PENNSYLVANIA

ROTOR FOR TURBOGENERATORS

Application filed July 3, 1929, Serial No. 375,609, and in Germany July 6, 1928.

My invention relates to improvements in rotors for turbogenerators.

In providing damping or amortisseur windings in turbogenerators filling or intermediate pieces of insulating material are inserted into the rotor slots between the damping bars and the working windings, for the purpose of compensating the thickening of the short-circuiting rings connecting the damping windings with one another. The short-circuiting rings are made thicker in their radial width than the damping bars in order to adapt their cross-section which is traversed by the currents of a plurality of damping bars to the combined flow of electricity through these bars. Since the space for the short-circuiting rings is limited by the coil ends of the working winding the filling pieces mentioned take care that sufficient space is available for the strengthening of the short-circuiting rings in a radial direction. These filling pieces have, however, the disadvantage that at a definite depth of the rotor slots the machine is not fully utilized because the slots cannot accommodate as many conductors as they could if the intermediate pieces were absent. If, on the other hand, the same number of conductors is employed and the slots are deepened instead, a greater mechanical strain is thrown on the roots of the teeth of the rotor, which if this strain is not permissible calls for an increase of the diameter of the machine.

According to my invention the above drawbacks are eliminated by making the thickness of the short-circuiting rings equal or substantially equal to the radial depth of the damping bars. The rings will then be made broader in order to retain the same cross-sectional area, which is, however, not objectionable since there is ample space in an axial direction beyond the coil ends.

An embodiment of my invention is illustrated in the drawing affixed hereto and forming part of my specification.

The drawing illustrates in

Fig. 1, a longitudinal section through the end of the rotor of a turbogenerator, and Fig. 2, a development of the damping winding.

Refering to the drawing, 1 indicates the iron of the rotor, and 2 the winding located in its slots. 3 indicates a slot wedge, 4 the cap over the coil ends, which rests upon a ring 5 and is secured against axial displacement by a locking ring 6. Between the wedge 3 and the winding 2 are located the damping bars 7 which are connected with one another by the short-circuiting ring 8 and are insulated from the winding by a layer of insulating material 9 and from the ends of the coil by a layer of insulating material 10. According to my invention the thickness $d$ of the winding ring is made equal to the radial depth $r$ of the damping bars. The width of the ring 8 is adapted to the number of the damping bars from which current flows into it. The damping bars 7 are preferably joined to the ring 8 by dovetailed tenons and mortises whereby a reliable connection is ensured of these parts. Intermediate the points of connection of the bars slits 11 are provided in the rings, the object of which, is to facilitate the insertion of the ring into the ends of the rods. The ring consists of a sheet metal strip provided with recesses and placed around the ends of the rods. The two ends of the ring are preferably overlapped by means of alternating recesses and projections of any suitable kind, in order to obtain a good contact between them and to keep the joint of the same thickess as the thickness of the ring so that the cap 4 may be made of equal thickness throughout. It will be understood, however, that this ring may consist of a single piece without any joint.

Various modifications and changes may be made without departing from the spirit and the scope of the invention, and I desire, therefore, that only such limitations shall be placed thereon as are imposed by the prior art.

I claim as my invention:

1. A rotor for turbogenerators, comprising in combination, an iron core with slots, a winding located in said slots, caps covering the ends of said winding, damping bars likewise located in said slots, said damping bars having a relatively small radial depth, and short-circuiting rings jointly comprising a plurality of integral pieces of a good conductor located between the ends of said winding and said caps and in the same plane as said bars, each integral piece being connected with the ends of a large number of said damping bars, the thickness of said short-circuiting rings being substantially equal to the radial depth of said damping bars.

2. A rotor for turbogenerators, comprising in combination, an iron core with slots, a winding located in said slots, caps covering the ends of said winding, damping bars likewise located in said slots, said damping bars having a relatively small radial depth, and short-circuiting rings jointly comprising a plurality of integral pieces of a good conductor located between the ends of said winding and said caps, the thickness of said short-circuiting rings being substantially equal to the radial depth of said damping bars, the ends of the bars constituting tenons co-planar with said bars and having the same radial thickness as said bars, and each of said integral pieces being wider, in an axial direction, than the length of said tenons and being mortised to receive a large number of said tenons.

3. A rotor for turbogenerators, comprising in combination, an iron core with slots, a winding located in said slots, caps covering the ends of said winding, damping bars likewise located in said slots, said damping bars having a relatively small radial depth, and short-circuiting rings jointly comprising a plurality of integral pieces of a good conductor located between the ends of said winding and said caps, the thickness of said short-circuiting rings being substantially equal to the radial depth of said damping bars, the ends of the bars constituting tenons having sides flaring outwardly laterally, and each of said integral pieces being wider, in an axial direction, than the length of said tenons and being mortised to receive a large number of said tenons.

4. A rotor for turbogenerators, comprising in combination, an iron core with slots, a winding located in said slots, caps covering the ends of said winding, damping bars likewise located in said slots and rings each consisting of a good conductor provided with spaced axial slits and located between said winding ends and said caps, said rings being joined to said damping bars by tenons and mortises intermediate said slits, the radial thickness of said short-circuiting rings and of said tenons being substantially equal to the radial depth of said damping bars.

5. A rotor for turbogenerators, comprising in combination, an iron core with slots, a winding located in said slots, caps covering the ends of said winding, damping bars likewise located in said slots, said damping bars having a relatively small radial depth, and short-circuiting rings each consisting of a separate piece comprising a good conductor of a thickness substantially equal to the radial depth of said damping bars, each of said rings being joined to all of said bars in a manner causing no substantial increase in thickness at the joints, said rings being located in the planes of the damping bars between said winding ends and said caps and bent from a single broad strip the ends of which are joined.

In testimony whereof, I have hereunto subscribed my name this 19th day of June, 1929, at Berlin-Siemensstadt, Germany.

LUDWIG KROPFF.